US012392905B2

(12) United States Patent
Levola et al.

(10) Patent No.: US 12,392,905 B2
(45) Date of Patent: Aug. 19, 2025

(54) METHOD FOR PERFORMING A PARALLEL SEARCH, RECEIVER, COMPUTER PROGRAM PRODUCT AND NON-VOLATILE STORAGE MEDIUM

(71) Applicant: u-blox AG, Thalwil (CH)

(72) Inventors: Aku Levola, Thalwil (CH); Boming Jin, Thalwil (CH)

(73) Assignee: u-blox AG, Thalwil (CH)

( * ) Notice: Subject to any disclaimer, the term of this patent is extended or adjusted under 35 U.S.C. 154(b) by 649 days.

(21) Appl. No.: 17/742,060

(22) Filed: May 11, 2022

(65) Prior Publication Data

US 2023/0003902 A1    Jan. 5, 2023

(30) Foreign Application Priority Data

Jul. 1, 2021  (EP) ..................................... 21183112

(51) Int. Cl.
*G01S 19/25*  (2010.01)
*G01S 19/29*  (2010.01)
*G01S 19/30*  (2010.01)

(52) U.S. Cl.
CPC ............ *G01S 19/256* (2013.01); *G01S 19/29* (2013.01); *G01S 19/30* (2013.01)

(58) Field of Classification Search
CPC ......... G01S 19/256; G01S 19/29; G01S 19/30
See application file for complete search history.

(56) References Cited

U.S. PATENT DOCUMENTS

| 2002/0172306 A1* | 11/2002 | Abraham | ............... | G01S 19/29 |
| | | | | 375/150 |
| 2003/0081660 A1* | 5/2003 | King | ...................... | G01S 19/29 |
| | | | | 375/150 |

(Continued)

FOREIGN PATENT DOCUMENTS

| CN | 106291616 A | * | 1/2017 | ............ | G01S 19/29 |
| EP | 2530488 | | 12/2012 | | |
| WO | WO 2003017503 | | 2/2003 | | |

OTHER PUBLICATIONS

EP Extended Search Report in European Appln. No. 21183112.8, dated Jan. 5, 2022, 10 pages.

*Primary Examiner* — Vladimir Magloire
*Assistant Examiner* — Fred H Mull
(74) *Attorney, Agent, or Firm* — Fish & Richardson P.C.

(57) ABSTRACT

The present disclosure relates to a method for performing a parallel search for a first positioning fix in a Global Navigation Satellite System (GNSS) receiver. The method includes, in some instances, determining prepositioning information, wherein the prepositioning information includes a receiver information and a satellite information for each satellite in a plurality of satellites. The method further includes determining a code phase search range and a frequency search range, based on the prepositioning information, for each satellite in the plurality of satellites. The method further includes determining a starting point information for each satellite in the plurality of satellites, wherein each respective starting point information is representative of an offset from a center of a search range of the respective satellite. The method further includes performing the parallel search for all satellites in the plurality of satellites based on the respective code phase search range, the respective frequency search range and the respective starting point information.

20 Claims, 3 Drawing Sheets

(56) References Cited

U.S. PATENT DOCUMENTS

| | | | |
|---|---|---|---|
| 2006/0250304 A1* | 11/2006 | Mo | G01S 19/28 342/357.67 |
| 2009/0224973 A1 | 9/2009 | Nayyar | |
| 2009/0315768 A1 | 12/2009 | Abraham | |
| 2012/0313815 A1 | 12/2012 | Yang | |
| 2015/0071332 A1* | 3/2015 | Xu | G01S 19/30 375/150 |

* cited by examiner

METHOD FOR PERFORMING A PARALLEL SEARCH, RECEIVER, COMPUTER PROGRAM PRODUCT AND NON-VOLATILE STORAGE MEDIUM

CROSS-REFERENCE TO RELATED APPLICATIONS

This application claims priority to European Application No. EP21183112.8, filed on Jul. 1, 2021, the contents of which are incorporated herein by reference in their entirety.

TECHNICAL FIELD

This disclosure relates to a method performing a parallel search for a first positioning fix in a Global Navigation Satellite System, GNSS, receiver. The disclosure further relates to a GNSS receiver comprising a processing unit. The disclosure also relates to a computer program product and a non-volatile storage medium.

BACKGROUND ART

A Global Navigation Satellite System, GNSS, receiver can be used for positioning. Therefore, a satellite search process needs to be performed, such as a serial search scheme or a parallel search scheme, in order to obtain a first positioning fix. When a GNSS receiver is powered on, it may use prepositioning information when aiming to obtain a first positioning fix.

It is an object of the present disclosure to present a method, a receiver, a computer program product and a non-volatile storage medium, in which a reliable and time efficient parallel search for a first positioning fix is provided.

SUMMARY OF INVENTION

The above-mentioned object is solved by the subject-matter of the attached independent claims. Further embodiments are disclosed in the attached dependent claims.

According to a first aspect of the invention, a method for performing a parallel search for a first positioning fix in a Global Navigation Satellite System, GNSS, receiver, comprises the steps of:
determining prepositioning information, wherein the prepositioning information comprises a receiver information and a satellite information for each satellite in a plurality of satellites,
determining a code phase search range and a frequency search range, based on the prepositioning information, for each satellite in the plurality of satellites,
determining a starting point information for each satellite in the plurality of satellites, wherein each respective starting point information is representative of an offset from a center of a search range of the respective satellite, and
performing the parallel search for all satellites in the plurality of satellites based on the respective code phase search range, the respective frequency search range and the respective starting point information.

A detection of a satellite is based on time synchronization, which relies on alignment of received and locally generated pseudorandom codes. The GNSS receiver aims to synchronize the received and locally generated identical codes by determining a time shift that results in perfectly time-aligned sequences. The time shift may also be denoted as code phase.

In satellite navigation technology, time and position (range) are often interchangeable. A range can be expressed in time units by dividing it by the speed of light. Conversely, time can be expressed in range units when multiplied by the speed of light. Therefore, the code phase search consists of both time and position quantities.

When powering on the GNSS receiver, unknown time and range (error) terms obtained by the GNSS receiver may comprise: a local time bias of the GNSS receiver, an approximate location of the GNSS receiver, an information about a position of one or more satellites, atmospheric propagation delays, reflections and/or receiver hardware delays.

Similar to time synchronization, the GNSS receiver aims to synchronize to a frequency of a received signal by generating a local copy of it at substantially a same frequency as the received signal. At any relative movement between the signal source, i.e., the respective satellite, and the receiver a Doppler shift is implied. Similarly to time and range, clock drift and velocity may be considered interchangeable. Any deviation in the GNSS receiver's reference oscillator frequency may translate into an apparent Doppler shift in a frequency synchronization process. When powering on the GNSS receiver further unknown (error) terms may comprise a clock drift of the GNSS receiver and a velocity of the GNSS receiver relative to Earth. These (error) terms, which may affect the frequency synchronization are fewer in number and lesser in magnitude than the (error) terms with regard to the code phase synchronization. Therefore, the code synchronization problem may be more complex than frequency synchronization. However, the concepts laid out in the following are applicable to both code phase and frequency search.

An advantage of the method according to the first aspect is that a reliable and time efficient parallel search for the first positioning fix may be provided. The method according to the first aspect may be applied, when the GNSS receiver is powered on/started. In this situation, the GNSS receiver needs to obtain the first positioning fix.

The GNSS receiver may be an arbitrary GNSS receiver capable of using one or more of the available GNSS constellations when performing the method according to the first aspect. In other words, the GNSS receiver may be a multi GNSS receiver.

The parallel search may also be denoted as parallel search scheme. When performing the parallel search, each satellite or signal is searched simultaneously by respective hardware and software resources, i.e., search units, of the GNSS receiver.

According to the first aspect, a time for detecting a first satellite in the plurality of satellites, and consequently a time for obtaining the first positioning fix, may be reduced by adding controlled satellite specific offsets in the parallel search. For example, if the plurality of satellites comprises a number of N satellites, such a reduction may be achieved by a factor up to N. Compared with a (conventional) parallel search, especially in a situation, where one or more satellites are not detectable, i.e., due to obstruction and/or weak signal strength or the like, a robustness may be increased. This is achieved, by using offsets that correspond to the distribution of an expected common mode error. In this way, a maximum likelihood-type search of the common mode error is created.

Another technique for obtaining a first satellite detection and/or the first positioning fix, is a serial search/serial search scheme. When performing the serial search, the GNSS receiver selects one satellite of the plurality of satellites. For example, a satellite with the highest elevation in order to maximize the chance that the view/line of sight from the GNSS receiver to the selected satellite is not obstructed. Then a large part or all resources of the GNSS receiver are used to detect that satellite.

In the situation where one or more satellites are not detectable, i.e., due to obstruction and/or weak signal strength or the like, the serial search will need to first complete the search on a complete search space for one satellite. Due to the obstruction no detection may be possible. Then this procedure needs to be performed for the next satellite and so on. Therefore, the time to detect/acquire the first satellite may vary substantially. According to the first aspect, a time for detecting a first satellite may be the same as for a serial search, however, the time variance may be reduced. Thus, a more robust method is provided.

According to one embodiment before determining the prepositioning information, the method further comprises obtaining valid satellite orbit information and an uncertainty window of a position of the GNSS receiver.

Thus, the method according to the first aspect, may be particularly useful, when being applied to a so-called "hot start" and/or "warm start" scenario of the GNSS receiver. However, the method may also be applicable to various other scenarios of the GNSS receiver, such as aided starts or some other special scenarios. For example, the method is applicable in a scenario, wherein the GNSS receiver is arranged in a vehicle driving through a tunnel.

Depending on an actual application, the information prepositioning information may be stored internally in the GNSS receiver.

The receiver information is known a priori. Furthermore, the receiver information is representative of a position information of the GNSS receiver and a time information of the GNSS receiver. The position information may be estimated based on a last known position of the receiver, i.e., before powering off the receiver. The receiver information respectively position information and time information can be also received through external aiding before or during the search.

The respective satellite information comprises (the valid) satellite orbit information of the respective satellite, i.e., one or more satellite orbital parameters.

The prepositioning information has a certain accuracy depending on a quality of the position and the time information. Hence, the parallel search is performed by the GNSS receiver in a given uncertainty window. The error of the prepositioning information can be separated into a satellite-specific error and a common mode error, wherein the common mode error may be considered as a dominating factor and may be specific to the receiver. Therefore, when obtaining the first positioning fix, it is critical to detect/acquire and track a first satellite/signal as soon as possible. The method according to the first aspect provides a way to acquire the first satellite in a quick and robust way.

The plurality of satellites may comprise N satellites, wherein the N satellites are some or all satellites in view of the GNSS receiver. Additionally or alternatively, the plurality of satellites may be a subset of all satellites in view of the GNSS receiver. A size of such a subset may be determined based on a number of parallel search units available to the GNSS receiver for performing the parallel search.

The respective center of the search range may be the center of the respective code phase search range and/or the center of the respective frequency search range.

The method according to the first aspect may be a computer-implemented method.

According to a further embodiment the determining the prepositioning information comprises the steps:
obtaining a first time information, and
determining at least part of the prepositioning information based on the first time information.

With regards to GNSS, there is not just one single time. Each GNSS system, such as GPS, GLONASS, GALILEO, BeiDou. etc., has its "own" time. Moreover, each satellite has its deviation from it, although it can be considered negligible. However, the bulk of the time/drift errors are specific to the receiver.

The first time information is used to synchronize the GNSS receiver to each satellite it acquires. It is an arbitrary time information, which is available to the receiver at the time the method is performed. The first time information may be a UTC or a GNSS system time.

The first time information may be based on a calibrated or an uncalibrated real time clock, RTC, of the GNSS receiver. For example, the method according to the first aspect may be particularly useful, when the first time information is based on the uncalibrated RTC clock. Alternatively, the first time information may be obtained via Network Time Protocol, NTP, or clock aiding or the like. The first time information can be obtained from either an external device, i.e. the aforementioned device external to the receiver, or from internal calculations performed by the GNSS receiver.

According to a further embodiment at least part of the prepositioning information is received from a device external to the GNSS receiver.

The "at least some part" of the prepositioning information according to the embodiment may comprise some or all of the prepositioning information.

The device external to the GNSS receiver may be an arbitrary device and/or part of a host system and/or a network. It may be part of some service and/or configured to provide some or all of the prepositioning information for performing the parallel search.

According to a further embodiment each starting point information comprises a first starting point information, which is representative of an offset from a center of the code phase search range of the respective satellite.

In this way, a reliable and time efficient parallel search for the code phase search range may be provided.

According to a further embodiment each starting point information comprises a second starting point information, which is representative of an offset from a center of the frequency search range of the respective satellite.

In this way, a reliable and time efficient parallel search for the frequency search range may be provided.

According to a further embodiment the method further comprises the steps:
detecting a first satellite in the plurality of satellites based on the parallel search, and
determining a further prepositioning information based on the detection of the first satellite.

In this way, the method may be iteratively performed and a time efficient parallel search may be provided.

As soon as the first satellite is detected, the GNSS receiver may be enabled to resolve time and clock drift error terms of the prepositioning information. These are representative of the dominating contributors to the size of the search space. Therefore, as soon as the first satellite is detected, the prepositioning may be re-computed with new information obtained by the detection of the first satellite. In this way, the search spaces of the respective satellites may be greatly reduced. Thus, all on-going (parallel) search processes are stopped and may be re-started with further new prepositioning information. For example, in an ideal case, the further prepositioning is so accurate, that the reduced search space may be covered by a single search step.

According to a further embodiment the method further comprises performing a further parallel search for a subset of satellites in the plurality of satellites based on the further prepositioning information.

The subset of satellites in the plurality of satellites may comprise all satellites in the plurality of satellites except the first detected satellite. In other words, the subset may comprise solely non-detected satellites. Additionally or alternatively, the subset may an arbitrary subset of the plurality of satellites. For example, a size of the subset may be determined based on the number or parallel search units available for the further parallel search.

The further parallel search may be conducted similar to the parallel search as described above, based on the (updated) further prepositioning information. The further parallel search may be substantially quicker when compared to the previous parallel search.

For example, when performing the further parallel search, a further first satellite may be detected. With each detection, respective results are fed back in order to iteratively determine the further prepositioning information and to perform the further parallel search, until the first positioning fix is obtained. For example, it may be necessary to track a few satellites, e.g. 3 to 7 satellites, in order to achieve the first positioning fix.

In the following embodiments, the disclosure is presented with respect to offsets being uniformly distributed within a common mode search range or search window, to which the aspects of the disclosure may be applied. This example is chosen for a consistent and easily understandable presentation of the disclosure. The disclosure, however, is not limited in this regard. It is to be understood, that the offsets may also follow any other suitable distribution. The term "suitable" in this case refers to a distribution having a sufficient entropy in order for the method to provide the aforementioned advantages. For example, any flat type of distribution may be applicable, i.e., a standard deviation needs to be substantially large. A different shape of the distribution may provide a different optimal solution.

According to a further embodiment the offsets from the centers of the search ranges of the plurality of satellites are uniformly distributed in a common mode search range. The determining the starting point information for each satellite in the plurality of satellites comprises determining the starting point information according to the following formula:

$$s_k = E * \left( \frac{2k}{N+1} - 1 \right)$$

wherein
$s_k$ denotes the starting point information for a satellite k, wherein k is a number between 1 and N
N denotes the number of satellites in the plurality of satellites, and
[−E, E] denotes the common mode search range.

The common mode search range is determined based on a time uncertainty, for example an RTC uncertainty. In other words, the common mode search range may be calculated based on the first time information.

According to a further embodiment the offsets from the centers of the search ranges of the plurality of satellites are uniformly distributed in a common mode search range. The determining the starting point information for each satellite in the plurality of satellites comprises determining the starting point information based on a binary tree.

According to a further embodiment the offsets from the centers of the search ranges of the plurality of satellites are uniformly distributed in a common mode search range. The determining the starting point information for each satellite in the plurality of satellites comprises determining the starting point information based on a pseudo random number generator.

According to a further embodiment the offsets from the centers of the search ranges of the plurality of satellites follow a Gaussian distribution of an equal variance. The determining the starting point information for each satellite in the plurality of satellites comprises determining the starting point information based on the Gaussian distribution.

According to a second aspect of the invention, a GNSS receiver comprises a processing unit, which is configured to perform the method according to the first aspect.

The GNSS receiver may comprise a transceiver unit, which is configured to obtain and/or request one or more parts of information in order to perform the method according to the first aspect.

According to a third aspect of the invention, a computer program product comprises instructions which, when executed by a computing device, cause the computing device to carry out the method according to the first aspect.

According to a fourth aspect of the invention, a non-volatile storage medium comprises a computer program product according to the third aspect.

Advantages and further embodiments of the second, third and fourth aspect correspond, in general, to those discussed above with respect to the first aspect.

Further embodiments and advantages are disclosed in the attached dependent claims, the figures and the description thereof. In the figures, the disclosure is presented with respect to solely the code phase search range, to which the aspects of the disclosure may be applied. This example is chosen for a consistent and easily understandable presentation of the disclosure. The disclosure, however, is not limited in this regard. Elements and functional blocks having the same or similar function bear the same reference numerals throughout the drawings. Hence their description is not necessarily repeated in following drawings.

DESCRIPTION OF EMBODIMENTS

Figure 1:
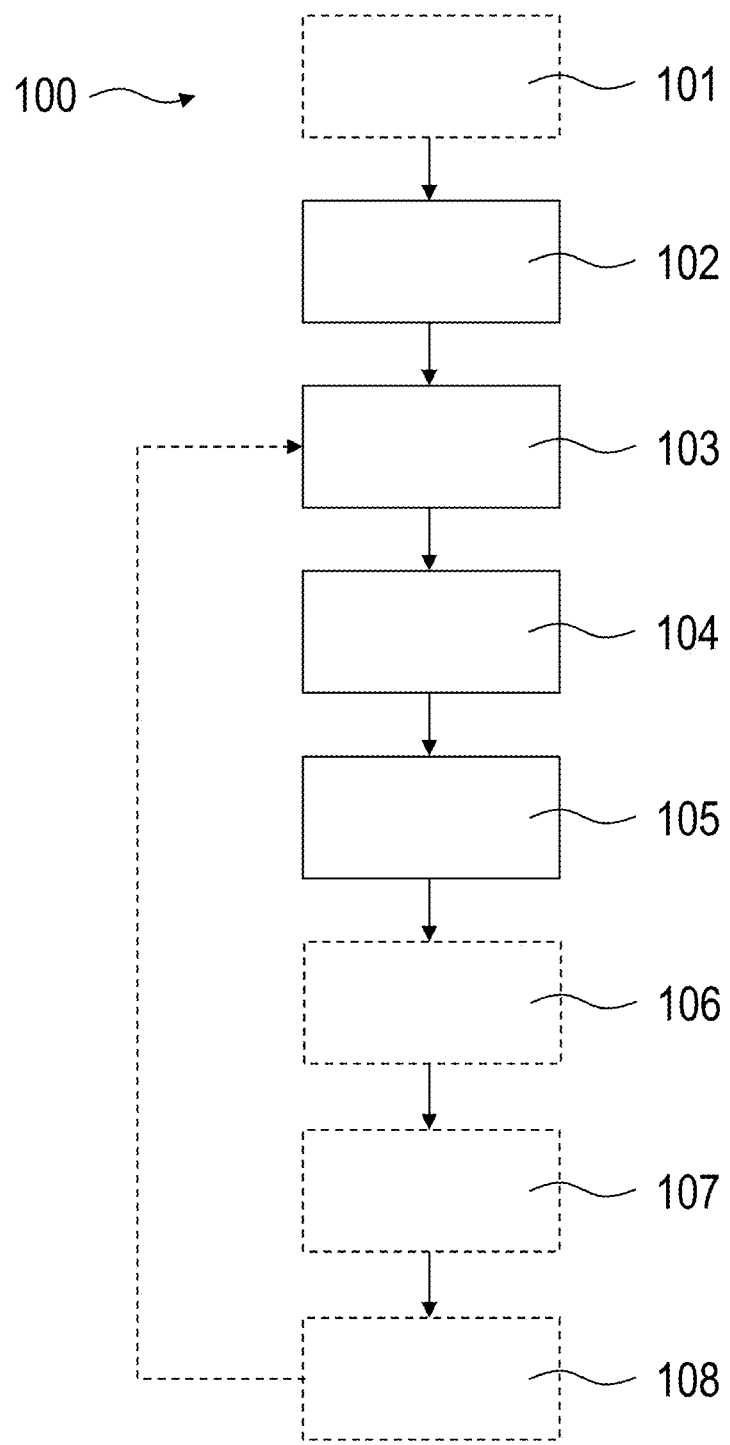
FIG. 1 shows a flowchart of a method for performing a parallel search.

FIG. 1 shows a flowchart of a method 100 for performing a parallel search for a first positioning fix in a Global Navigation Satellite System, GNSS, receiver. In the flowchart, optional steps are marked with dashed line boxes and the remaining steps are marked with solid line boxes.

Optionally, in a first step 101, valid satellite orbit information and an uncertainty window of a position of the GNSS receiver are obtained.

For example, the GNSS receiver is a multi GNSS receiver, which is powered up in a so-called "hot start" scenario.

In a second step 102, prepositioning information is determined. The prepositioning information comprises a receiver information and a satellite information for each satellite in a plurality of satellites. The determining the prepositioning information comprises obtaining a first time information.

For example, the plurality of satellites comprises between N=20-40 satellites in view of the GNSS receiver.

For example, a first part of the prepositioning information is determined based on the first time information. A second part of the prepositioning information is received from a device external to the GNSS receiver.

For example, the receiver information comprises a receiver's time with regard to GNSS time, a receiver's clock drift, a receiver's position and a receiver's velocity.

For example, the respective satellite information comprises one or more satellite orbital parameters of the respective satellite.

In a third step 103, a code phase search range for each satellite in the plurality of satellites and a frequency search range for each satellite in the plurality of satellites are determined. This is done, based on the prepositioning information determined in the second step 102.

In a fourth step 104, a starting point information for each satellite in the plurality of satellites is determined. Each respective starting point information is representative of an offset from a center of a search range of the respective satellite.

For example, each starting point information comprises a first starting point information and a second starting point information. Each first starting point information is representative of an offset from a center of the code phase search range of the respective satellite. Each second starting point information is representative of an offset from a center of the frequency search range of the respective satellite.

The offsets are determined in order to minimize an expected distance between the common mode error and the respective nearest starting offset in a statistically optimal sense.

The examples described in the following may be applied to the first starting point information and/or the second starting point information. In other words, these examples are applicable to the code phase search range and/or the frequency search range.

According to a first example described herein, the offsets from the centers of the search ranges of the plurality of satellites are uniformly distributed in a common mode search range. The starting point information for each satellite is determined according to the formula:

$$s_k = E * \left( \frac{2k}{N+1} - 1 \right)$$

wherein
$s_k$ denotes the starting point information for a satellite k, wherein k is a number between 1 and N
N denotes the number of satellites in the plurality of satellites, and
[−E, E] denotes the common mode search range.

According to the first example, when E=1 and N=4, the offsets may be determined as [−0.6, −0.2, 0.2, 0.6]. It should be noted that E is not normalized. For example, it has a unit of time/range or frequency/drift.

According to a second example described herein, the offsets from the centers of the search ranges of the plurality of satellites are uniformly distributed in the common mode search range. The starting point information for each satellite is determined based on a binary tree.

According to the second example, the offsets may be given as [0, −0.5, 0.5, −0.75, 0.75, −0.25, 0.25, . . . ].

According to a third example described herein, the offsets from the centers of the search ranges of the plurality of satellites are uniformly distributed in a common mode search range. The starting point information for each satellite is determined based on a pseudo random number generator.

According to a fourth example described herein, the offsets from the centers of the search ranges of the plurality of satellites follow a Gaussian distribution of an equal variance. The starting point information for each satellite is determined based on the Gaussian distribution.

In a fifth step 105, the parallel search is performed for all satellites in the plurality of satellites based on the respective code phase search range, the respective frequency search range and the respective starting point information.

Optionally, in a sixth step 106, based on the parallel search a first satellite in the plurality of satellites is detected.

Optionally, in a seventh step 107, a further prepositioning information is determined based on the detection of the first detected satellite.

For example, the further prepositioning information is determined based on the first time information.

Optionally, in an eighth step 108, based on the further prepositioning information, a further parallel search is performed for a subset of satellites in the plurality of satellites, e.g. by returning to step 103.

For example, the subset comprises all satellites in the plurality of satellites except the first detected satellite.

The steps of determining the further prepositioning information and performing a further parallel search may be iteratively performed after each detection. The iterations are performed at least until the first positioning fix is obtained, i.e., a minimum of typically three to seven, e.g. four satellites has been detected.

Performing the method 100 according to the examples presented herein, may be particularly useful, if a time error is present in the GNSS receiver. In other words, if the receiver's clock is biased.

Figure 2:
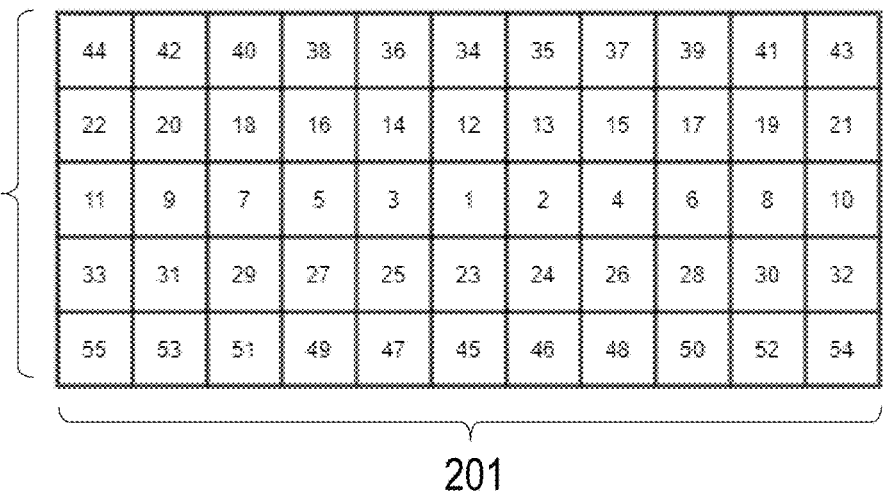
FIG. 2 shows a schematic drawing of a search space.

A schematic drawing of a search space, i.e. for a first positioning fix performed by the GNSS receiver, is shown in FIG. 2. The search space according to FIG. 2, is a two dimensional search space. The first dimension is represented by a code phase search range 201. The second dimension is represented by a frequency search range 202.

For example, in order to detect the first satellite, both code phase and frequency of the respective satellite need to be aligned. If either code or frequency are not matching, the first satellite is not detected. Thus the GNSS receiver cannot infer any information. Specifically, no determination may be made if the code phase should be increased or decreased, for example. Thus, a search process is representative of a two dimensional search problem, where each code phase and frequency combination needs to be tried until a detection occurs.

Conventionally, in a first step, a frequency is selected from the frequency search range. Then the entire code phase range is searched at the selected frequency. If there is no detection, another frequency is selected and the code phase search is repeated accordingly. Furthermore, conventionally, both the code phase search and the frequency search are started at the center of the respective search range. Subsequently, it is proceeded symmetrically around the center.

FIG. 2 also depicts the progress of a conventional search covering both code phase and frequency search spaces. The conventional search process starts at the center of both the code phase search range 201 and the frequency search range 202, i.e., the cell labeled with "1". If no detection may be determined, the cell with "2" will be evaluated next, followed by "3" etc.

Figure 3:
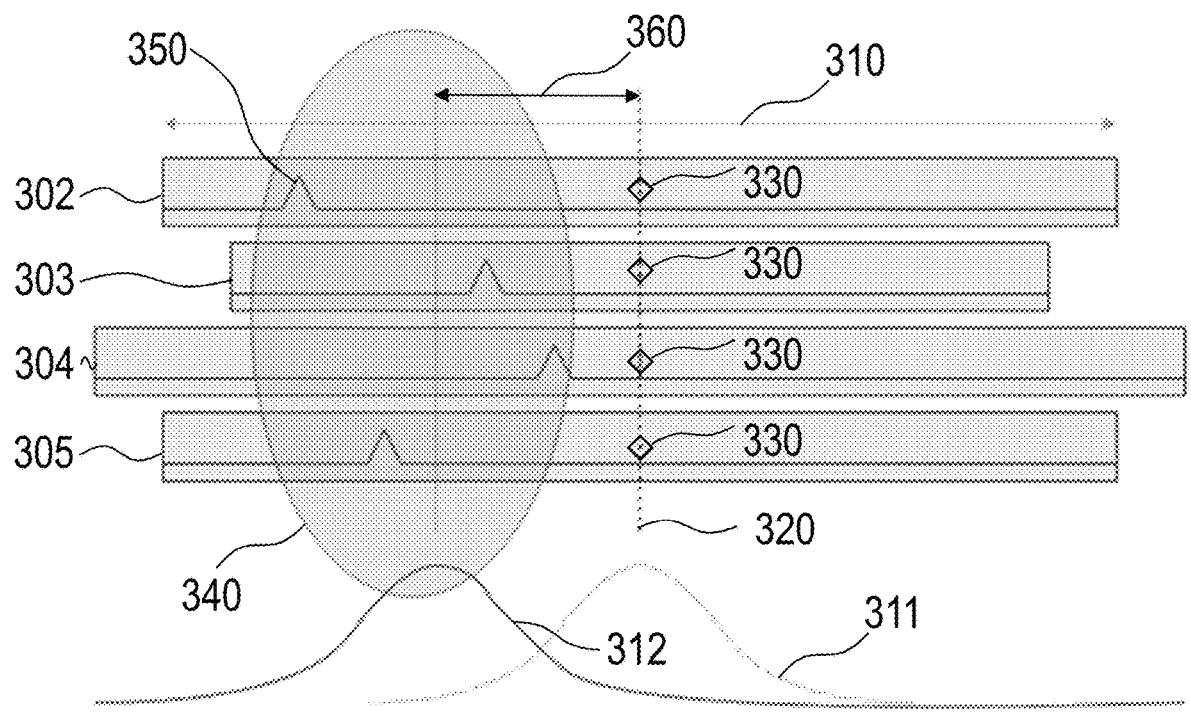
FIG. 3 shows a schematic drawing of a conventional parallel search.

A schematic drawing of a conventional parallel search in the GNSS receiver is shown in FIG. 3.

FIG. 3 depicts four satellites 302-305 and respective code phase search ranges of the satellites 302-305. The four satellites comprise a second satellite 302, a third satellite 303, a fourth satellite 304 and a fifth satellite 305.

For example, the satellites 302-305 form the plurality of satellites.

The search range 310 of the second satellite 302 is representative of the satellite and clock uncertainty of the second satellite 302. It may further be representative of the uncertainty of the receiver's position, velocity, time and/or clock drift.

According to the conventional parallel search, a search starting point 330 is located at the center 320 of the search range 310 of the second satellite 302. The same applies to the respective search starting points 330 for the satellites 303-305.

Furthermore, FIG. 3 depicts an actual signal 350 of the second satellite 302. As prepositioning errors of the satellites 302-305 are correlated, the actual signals form a cluster 340 in the search range. The distance of the cluster 340 from the center 320 of the search range 310 is dependent on the clock bias 360 of the GNSS receiver. The receiver's clock bias 360 may also be denoted as common mode error.

For example, if the receiver's clock bias 360 is large compared to a size of the cluster 340, then all satellites 302-305 will detect the cluster 340 approximately at a same time. The curves 311 and 312 show a priori error distributions, wherein curve 311 assumes a center of the distribution at the center 320 of the search range 310, whereas a center of the distribution of curve 312 corresponds to the center of the cluster 340.

Figure 4:
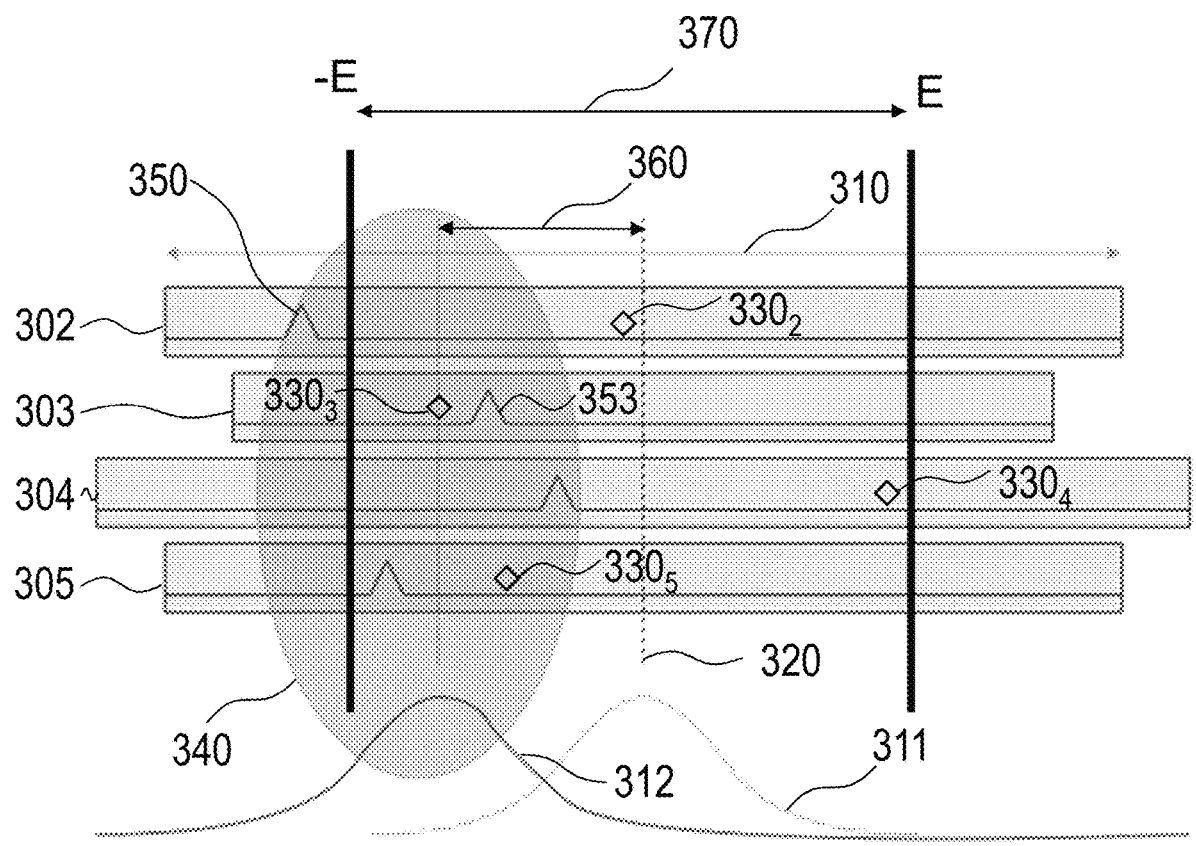
FIG. 4 shows a schematic drawing of a parallel search according to the embodiments of the present invention.

A schematic drawing of a parallel search according to the embodiments of the present invention is shown in FIG. 4.

The schematic drawing of the parallel search according to FIG. 4 is similar to the schematic drawing of the conventional parallel search according to FIG. 3. In the following, only the differences are described.

According to FIG. 4, respective search starting points are offset from the center 320 of the search range 310, in particular within the common mode search range 370 that is a subset of the search range 310. For each of the different satellites 302-305, a respective offset may be determined, resulting in respective search starting points $330_2$, $330_3$, $330_4$ and $330_5$.

By adding controlled satellite specific offsets in the parallel search, a time for obtaining the first positioning fix, may be reduced. In other words, by distributing the search starting points, the cluster 340 may be detected more quickly.

For example, the starting point $330_3$ for the search of the third satellite 303 is considerably closer to the actual signal 353 of the third satellite 303 compared to the other satellites. Thus, the third satellite 303 may be the first detected satellite.

With more satellites forming the plurality of satellites, a statistical probability may increase for any one of the search starting points to be located near to the cluster 340.

LIST OF REFERENCE SIGNS 100 method for performing a parallel search
101-108 steps
201 code phase search range
202 frequency search range
302 second satellite
303 third satellite
304 fourth satellite
305 fifth satellite
310 search range
311, 312 a priori error distribution
320 center of search range
330 search starting point
340 cluster
350, 353 actual signal
360 receiver's clock bias
370 common mode search range

The invention claimed is:

1. A method for performing a parallel search for a first positioning fix in a Global Navigation Satellite System (GNSS) receiver, the method comprising:
  determining prepositioning information, wherein the prepositioning information comprises a receiver information and a satellite information for each satellite in a plurality of satellites,
  determining a code phase search range and a frequency search range, based on the prepositioning information, for each satellite in the plurality of satellites,
  determining a search starting point information for each satellite in the plurality of satellites, wherein each respective search starting point information is representative of an offset from a center of a search range of the respective satellite, and
  performing the parallel search for all satellites in the plurality of satellites based on the respective code phase search range, the respective frequency search range and the respective search starting point information,
  wherein the offsets from the centers of the search ranges of the plurality of satellites follow a Gaussian distribution of an equal variance or are uniformly distributed in a common mode search range, which is a subset of the respective search range.

2. The method according to claim 1, wherein determining the prepositioning information comprises:
  obtaining a first time information, and
  determining at least part of the prepositioning information based on the first time information.

3. The method according to claim 1, wherein at least part of the prepositioning information is received from a device external to the GNSS receiver.

4. The method according to claim 1, wherein each search starting point information comprises a first search starting point information, which is representative of an offset from a center of the code phase search range of the respective satellite.

5. The method according to claim 4, wherein each search starting point information comprises a second search starting point information, which is representative of an offset from a center of the frequency search range of the respective satellite.

6. The method according to claim 1 further comprising:
   detecting a first satellite in the plurality of satellites based on the parallel search, and
   determining a further prepositioning information based on the detection of the first satellite.

7. The method according to claim 6, wherein the method further comprises performing a further parallel search for a subset of satellites in the plurality of satellites based on the further prepositioning information.

8. The method according to claim 1, wherein
   the offsets from the centers of the search ranges of the plurality of satellites are uniformly distributed in the common mode search range, and
   determining the search starting point information for each satellite in the plurality of satellites comprises determining the search starting point information according to the formula:

$$s_k = E * \left( \frac{2k}{N+1} - 1 \right)$$

wherein
$s_k$ denotes the search starting point information for a satellite k, wherein k is a number between 1 and N
N denotes the number of satellites in the plurality of satellites, and
[−E, E] denotes the common mode search range.

9. The method according to claim 1, wherein:
   the offsets from the centers of the search ranges of the plurality of satellites are uniformly distributed in a common mode search range, and
   determining the search starting point information for each satellite in the plurality of satellites comprises determining the search starting point information based on a binary tree.

10. The method according to claim 1, wherein:
    the offsets from the centers of the search ranges of the plurality of satellites are uniformly distributed in a common mode search range, and
    determining the search starting point information for each satellite in the plurality of satellites comprises determining the search starting point information based on a pseudo random number generator.

11. The method according to claim 1, wherein:
    the offsets from the centers of the search ranges of the plurality of satellites follow the Gaussian distribution of an equal variance, and
    determining the search starting point information for each satellite in the plurality of satellites comprises determining the search starting point information based on the Gaussian distribution.

12. The method according to claim 1, wherein before determining the prepositioning information, the method further comprises obtaining valid satellite orbit information and an uncertainty window of a position of the GNSS receiver.

13. A Global Navigation Satellite System (GNSS) receiver, comprising a processing unit which is configured to perform a parallel search for a first positioning fix in the GNSS receiver, the parallel search including:
    determining prepositioning information, wherein the prepositioning information comprises a receiver information and a satellite information for each satellite in a plurality of satellites,
    determining a code phase search range and a frequency search range, based on the prepositioning information, for each satellite in the plurality of satellites,
    determining a search starting point information for each satellite in the plurality of satellites, wherein each respective search starting point information is representative of an offset from a center of a search range of the respective satellite, and
    performing the parallel search for all satellites in the plurality of satellites based on the respective code phase search range, the respective frequency search range and the respective search starting point information,
    wherein the offsets from the centers of the search ranges of the plurality of satellites follow a Gaussian distribution of an equal variance or are uniformly distributed in a common mode search range, which is a subset of the respective search range.

14. The GNSS receiver according to claim 13, wherein the processing unit is configured to determine the prepositioning information, and wherein determining the prepositioning information comprises:
    obtaining a first time information, and
    determining at least part of the prepositioning information based on the first time information.

15. The GNSS receiver according to claim 13, wherein at least part of the prepositioning information is received from a device external to the GNSS receiver.

16. The GNSS receiver according to claim 13, wherein each search starting point information comprises a first search starting point information, which is representative of an offset from a center of the code phase search range of the respective satellite.

17. The GNSS receiver according to claim 16, wherein each search starting point information comprises a second search starting point information, which is representative of an offset from a center of the frequency search range of the respective satellite.

18. The GNSS receiver according to claim 13 wherein the processing unit is further configured to:
    detect a first satellite in the plurality of satellites based on the parallel search, and
    determine a further prepositioning information based on the detection of the first satellite.

19. The GNSS receiver according to claim 13, wherein the processing unit is configured to perform a further parallel search for a subset of satellites in the plurality of satellites based on the further prepositioning information.

20. At least one non-volatile machine-readable storage medium comprising machine-readable instructions that, when executed by at least one computing device, cause the at least one computing device to perform a parallel search for a first positioning fix in a Global Navigation Satellite System (GNSS) receiver, including:
    determining prepositioning information, wherein the prepositioning information comprises a receiver information and a satellite information for each satellite in a plurality of satellites,
    determining a code phase search range and a frequency search range, based on the prepositioning information, for each satellite in the plurality of satellites,
    determining a search starting point information for each satellite in the plurality of satellites, wherein each respective search starting point information is representative of an offset from a center of a search range of the respective satellite, and performing the parallel search for all satellites in the plurality of satellites based on the respective code phase search range, the respective frequency search range and the respective search starting point information, wherein the offsets from the centers of the search ranges of the plurality of satellites follow a Gaussian distribution of an equal variance or are uniformly distributed in a common mode search range, which is a subset of the respective search range.

\* \* \* \* \*